April 25, 1939.  R. R. RIDGWAY  2,155,682
METHOD OF MAKING ABRASIVE METAL CARBIDES
Original Filed Nov. 21, 1935
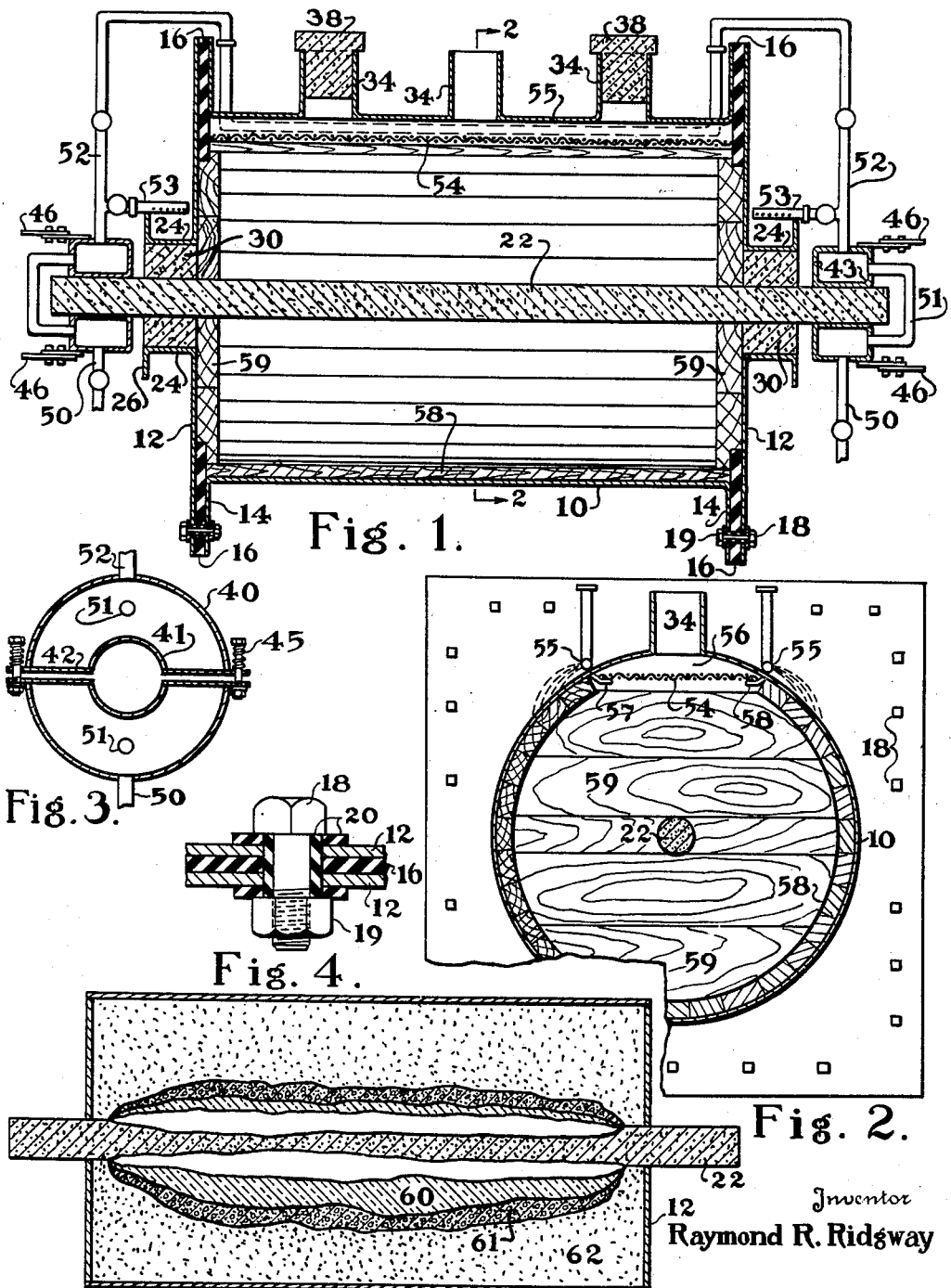
Inventor
Raymond R. Ridgway
By Clayton L. Jenks
Attorney Patented Apr. 25, 1939

2,155,682

UNITED STATES PATENT OFFICE 2,155,682

METHOD OF MAKING ABRASIVE METAL CARBIDES

Raymond R. Ridgway, Niagara Falls, N. Y., assignor to Norton Company, Worcester, Mass., a corporation of Massachusetts Original application November 21, 1935, Serial No. 50,932. Divided and this application May 14, 1936, Serial No. 79,646

8 Claims. (Cl. 23—208)

This invention relates to a method of making abrasive metal carbides and more particularly to the manufacture of boron carbide, silicon carbide, titanium carbide, and tungsten carbide which react readily with oxygen or nitrogen under various conditions.

Silicon carbide has been made heretofore in a substantially open electric resistance furnace from a mixture comprising silica and carbon placed in a brick structure around a graphite resistor, through which an electric current is passed to heat the charge to a synthesizing temperature. Heretofore, the bricks of the furnace walls have been arranged to form an open structure through which the evolved gas may readily escape and be burned by the oxygen of the atmosphere and a volatile oil has been mixed with the charge to drive out the air. It is however difficult to control the atmosphere within the charge and to maintain the best temperature conditions for an efficient furnace run. This control is particularly important in the process of electrically synthesizing boron carbide from a mixture of boric oxide and carbon since if precautions are not taken to exclude air from the heated charge and to control the temperature some of the volatile boron metal may escape from the furnace in an evolution of copious fumes of boron oxide. Also, after the ingot of boron carbide had been made during the heating stage, the final product may be oxidized to a serious extent by an influx of air through the open brick work during the cooling stage. Similarly, any attempt at making boron carbide in an open arc furnace would result in high losses of boron as a volatile vapor and its oxidation to boron oxide. It is desirable to hold the volatile boron within the charge during the furnace run and particularly to exclude air from contact with the boron carbide during both the heating and the cooling stages in order that efficiency of operation and a high yield may be obtained.

The same principles apply in the manufacture of the other abrasive metal carbides which may oxidize readily when heated or react with nitrogen. For example, titanium and titanium carbide have a great affinity for nitrogen, and the usual attempts at making the latter have resulted in the production of a cyanonitride and not a pure titanium carbide.

A primary object of this invention is, therefore, to provide an economical and efficient method of making the abrasive metal carbides wherein oxidation of the product or reaction with nitrogen or losses by volatilization are minimized; and particularly to make the abrasive metal carbide by electrical synthesis of a suitable charge within an electric resistance furnace having a resistor located centrally of the charge which in turn is entirely enclosed by impervious furnace walls arranged to control the furnace temperatures and to prevent access of air to the charge and loss of volatile values while permitting the escape of the evolved gases.

Referring to the drawing illustrating this invention:

Fig. 1 is a vertical section through one form of furnace which is suitable for carrying out my process;

Fig. 2 is a vertical section on the line 2—2 of Fig. 1;

Fig. 3 is a sectional detail of the water cooled electrode clamping device;

Fig. 4 is an enlarged sectional detail of one of the devices employed for bolting the walls together; and Fig. 5 is a diagrammatic sketch showing a typical boron carbide ingot at the end of a furnace run.

In accordance with this invention, I propose to make an abrasive metal carbide by providing a furnace charge of granular carbon and the oxide of the required metal mixed in suitable proportions for the electrical synthesis of the carbide and then heating this charge to the required temperature by passing a current through an electrical resistor located centrally therein and progressively forming a gradually enlarging ingot of the metal carbide, while controlling the temperature of both the inner and the outer zones of the charge and maintaining around the charge an atmosphere which is free from oxygen and nitrogen, after which the ingot is cooled within the furnace while air and other detrimental gases are excluded and reaction with the product is avoided.

The preferred structure employed for carrying out this process, and which embodies the various features herein claimed, comprises a water cooled metal casing carrying a resistor centrally supported within the charge and having outwardly projecting water cooled electric terminals for connection with a power circuit, the casing and resistor being so constructed and arranged as to provide for escape of the generated gas but prevent access of the atmosphere to the charge. All of these features are illustrated in the structures shown in the drawing.

In the embodiment shown in Figs. 1 and 2, the furnace comprises a metal casing having a cylindrical or peripheral wall 10 of iron, aluminum or other suitable metal and the two end walls 12 of similar material which are shaped and arranged to form a cylindrical reaction chamber within which an electrical resistor is mounted substantially centrally or axially of the peripheral wall. This wall 10 may of course be made of a plurality of flat sides arranged as the sides of a parallelopipedon or in other desired form. For the purpose of fastening the peripheral wall to the end walls, the former is provided with outstanding annular flanges 14 at its two ends, thus forming a spool shaped structure. The end walls 12 are each annular in shape and coextensive with the flanges, so that they may be readily fastened together.

In order that the end walls 12 may be electrically insulated from the peripheral portion 10 of the casing, a gas tight insulation 16 of asbestos or other suitable material is placed between the flanges and the end walls. This insulation is made annular in shape and located only adjacent to the flanges 14, since it is not needed at the central portion of the furnace and particularly because it is fusible at the high temperature of the resistor. To facilitate assembly and loading of the furnace charge, the end walls are made readily removable. They are fastened to the flanges, as indicated in Fig. 4, by the bolts 18 passing through aligned openings in the metal parts and the asbestos ring therebetween and secured in place by the nuts 19. The various parts of the clamping bolts and nuts are also insulated from the metal parts by means of the insulating washers and sleeves 20 which may be made of any suitable material, such as asbestos.

The resistor 22 is mounted axially of the peripheral wall 10 and arranged to extend through the charge and project outwardly from each end of the casing. In order to support the resistor, each of the annular end walls 12 is provided with a cylindrical extension or hub 24 which has an outwardly extending flange 26. These parts form an annular trough within which cooling water may flow. Mounted within these cylindrical hubs 24 are graphite sleeves 30 which have been shaped to fit snugly therein and prevent the passage of gases as well as to conduct heat to the water cooled trough wall 24. The graphite sleeves 30 in turn support the resistor rod 22 which is adapted to carry the electrical current for heating the charge of material within the casing. This resistor is preferably made of graphite, although it may be made of other suitable electrically conductive material depending upon the nature of the charge being treated. This graphite rod 22 is also shaped for accurate sliding fit within the sleeves 30 so as to provide a gas tight joint and a heat conducting path. Thus the sleeve 30 serves as an enlargement on the end of the high temperature rod 22 which may be water cooled sufficiently at its outer surface so that it may be supported on the metal wall of the hub 24 and in turn cool the exposed end of the resistor rod. Being made of the same materials, the rod and the sleeve have the same coefficients of expansion and the joint therebetween cannot open to permit passage of gas to or from the furnace chamber.

Egress of the gases generated during the operation of the furnace is permitted through the pipes 34, which have open upper ends and are welded to the casing 10 around suitably shaped holes therein. Plugs 38 of graphite or other suitable material are arranged to close the passages during the cooling stage. When the furnace is running, two of the plugs may be left loosely in place to prevent any circulation of air into the casing as the generated carbon monoxide gas escapes through the third opening. These plugs are left somewhat loose however so that they may be blown out by the gas pressure and provide an emergency exit for the gas, in case the third passage becomes plugged through a building up of deposited material adjacent to the opening thereof. During the cooling step, all of the plugs may be fitted in place, or one may be allowed to remain open while kerosene is injected to provide a neutral to reducing atmosphere.

In the embodiment shown in Fig. 1, electrical connections are made at the two ends of the graphite resistor 22 by means of clamps which are shown in detail in Fig. 3 of the drawing. Each of these clamps comprises two hollow casings through which water may be passed to keep them cool. Each of these casings is made of two semi-cylindrical concentric walls 40 and 41 connected by the diametrically positioned walls 42 and the end walls 43 to form a closed chamber. The central wall 41 of each of these clamps is shaped to fit against the outer surface of the resistor rod 22 and be clamped tightly there again. The clamping devices 45 comprise bolts, nuts and springs as clearly shown.

The electrode terminals are suitably fastened to these clamping members as by welding metal strips 46 thereon, so that the electric current may be readily transmitted from an outside source of power to the resistor rod. It will be understood that various electrical apparatus well known to those skilled in the art is to be employed in connection with this furnace structure for transmitting the required electrical power to the furnace and regulating the same. It will also be understood that the dimensions of the furnace chamber and the length and cross sectional area of the resistor rod will be so proportioned as to obtain the desired electrical results. It is desirable in this type of furnace that the graphite resistor be sufficiently large relative to the size of the ingot to be made that it will not be wholly consumed or broken until the reaction has gone on for a sufficient time. It may be observed that in making boron carbide the rod is protected to a large extent by the boron carbide formed around it so that the boron oxide cannot contact and react therewith.

The exposed ends of the resistor rod and the end walls 12 are kept cool by circulating water through the hollow clamps and in the trough 24 surrounding the sleeve 30. This may be readily accomplished by means of the valved water pipes 50 which communicate from a suitable source of water supply to the lower members of the clamps. A pipe 51 connects the upper clamp with the lower member, and from each of the upper clamps a further pipe 52 carries water to the branch arm 53 where the water escapes through perforations into the upper portion of the trough 24. Likewise an extension of the pipe 52 communicates with the pipes 55 which extend longitudinally of the cylindrical wall 10 and near the top thereof. These pipes 55 are perforated so that water may issue therefrom and flow downwardly over the outer casing wall 10 for the purpose of keeping the wall cooled to a required temperature. Suitable valves may be provided for regulating the flow of water to these various parts. By using the sleeve 30, it is possible to cool the resistor rod 22 closely adjacent to the hot zone and thus further protect the end walls and the insulation within the chamber.

Located within the upper portion of the casing is a perforated wall 54 made of a coarse meshed screen of iron or other suitable metal which is arranged beneath the pipes 34 and spaced from the top of the casing wall 10 to provide a space 56 for the accumulation of gases generated within the charge and to prevent the charge from contacting with and closing the openings of the pipes 34. These screens may be welded in place if desired, or slidably secured by means of the metal strips 57 welded to and projecting downwardly from the wall 10. This space 56 thus provides a passage for the accumulation and escape of the large volume of carbon monoxide gas which is liberated during the furnace run. The exit pipe 34 may be connected to further piping to conduct the gas away from the furnace for such use as may be desired and particularly to prevent its escape into the room. Or, the gas may be allowed to burn quietly at the end of the exit tube 34. It will be appreciated that because of the generation of the large volume of gas during the furnace run, no air can enter the exit passage 34. This construction furthermore makes it feasible to provide an increased gas pressure within the reaction chamber which can be accomplished by controlling the egress of the outflowing gas.

It is also to be appreciated that by means of this closed furnace structure, any serious loss due to volatilization of boron metal during the decomposition of boron oxide will be largely prevented. This is due to the fact that oxygen cannot get access to this volatilized gas and burn it and because the casing is of such dimensions and the outer layer of the charge is sufficiently cool to condense the boron metal vapor and hold it entrapped therein. Because of the large space 56 provided in the upper portion of the reaction chamber, there is also little danger of the boron metal vapor escaping through a small blow hole in the charge, as might be the case if the walls were made of open brick work as heretofore devised. No vapor can escape from the furnace except through the passages to the exit openings provided and the temperature of the chamber 56 is sufficiently low so that the vapors are condensed therein and are retained in the charge.

The temperatures required for making the abrasive metal carbides are very high, and there is no commercially available refractory material which can be employed as a furnace wall which is intended to contact directly with the charge at its synthesizing temperature. This is particularly the case where boron oxide is present, since the hot material would serve as a flux for the ordinary ceramic refractories. Hence, it is essential that the granular furnace charge itself serve as the container within which the ingot of metal carbide may be formed. Consequently, the furnace chamber is made sufficiently large so as to provide room for an outer zone of the cooled charge which in turn supports the inner hot zone within which the ingot is made. That is, the diameter of the furnace chamber is large as compared with its length and with the diameter of the ingot or the hot reaction zone, as indicated in Fig. 5 of the drawing, wherein the ingot 60 of boron carbide is shown around the resistor 22 and surrounded by the fire sand 61 or partially converted material, which in turn is surrounded by the unconverted charge 62 enriched by volatilized products condensed therein. When the furnace is made sufficiently large, then an ordinary iron wall which is water cooled is satisfactory for this furnace structure, and the carbides may be made at a high temperature within the central zone of the furnace while the outer wall is held at a comparatively low temperature. Thus, the charge itself serves as a protection for the inner cooled wall of iron and neither the boron oxide nor any reaction product will attack this wall, nor will the wall material react with the charge to detrimentally affect the properties of the desired abrasive metal compound.

It is also desirable to build the furnace so as to take care of its electrical requirements. The metal carbide is a conductor of electricity at the high temperature employed. Hence, the metal walls ought to be far enough away so that they will not contact with this hot material. Also at the start of the furnace run, the resistance of the furnace is high and under the required high voltage impressed upon the resistor, there is considerable danger of leakage from the end walls 12 to the shell 10 and a serious loss of power. It is necessary that this alternate parallel circuit be broken at a point which is outside of the high temperature zone where the charge is not conductive and where the resistance of the charge is so high that the electrical leakage is small. Hence, the asbestos ring 16 is located outside of the high temperature zone, and particularly since the asbestos would fuse and become conductive adjacent to the center of the furnace. Therefore, the insulation 16 is arranged to extend inwardly only through a sufficient distance to prevent a short circuit between the metal walls 10 and 12.

As a further insulation, the furnace is lined with an insulative material which keeps the charge from contacting directly with the metal walls. I have found that a suitable insulation for this purpose comprises ordinary wooden boards which carbonize during the run of the furnace but are not consumed and so remain in a protective capacity. The arrangement illustrated comprises a set of boards 58 arranged parallel with the resistor rod and lining the inner furnace wall 10 except adjacent to the screen, as shown in Fig. 2. Likewise, the end walls are covered by the boards 59. Other suitable insulating material may be used. For instance, in the manufacture of silicon carbide, one might use silica brick in place of the wood; but these silica bricks would not be available for use in the manufacture of boron carbide because the boron oxide of the charge would attack the silica at the temperature of the furnace. Titania is a refractory material in itself, and it is feasible to use the water cooled shell for the charge of titanium oxide and carbon and to line the furnace with either wood or titania bricks. Similar conditions apply to the manufacture of tungsten carbide. It is found that the insulation of wood is best adapted for making this material as well as the other abrasive metal carbides, since it does not introduce undesired impurities into the reactive material.

The furnace walls and the charge located adjacent thereto must be kept sufficiently cool so that their conductivity is low and the danger of current leakage is small. The end walls 12 of the furnace are kept cool by pouring water into the trough 24 and thus cooling the wall 12 by conduction. If desired, a further water spray may be thrown directly upon the end walls at any suitable point. It is to be noticed, as shown in Fig. 2, that the top portion of the casing 10 is not wetted by the water spray, since it is thrown onto the casing at a point below the screen 54. This insures that the space 56 within the casing is held at a high enough temperature so that the volatile boron oxide fumes are condensed to a liquid but not solidified, and the material is sufficiently hot so that it will drip back into the charge and cannot plug up the upper portion of the casing and prevent escape of the carbon monoxide gas.

The operation of this furnace will be apparent from the above disclosure. In order to load it, the furnace may be set up on one end and the other end wall 12 removed. Then with the screen 54, the wooden boards 58 and 59 and the resistor rod 22 in position, the charge may be suitably packed around the resistor. Thereafter the upper end wall 12 and asbestos ring 16 are bolted in place and the upper sleeve 30 assembled on the resistor and slid into position. The furnace when loaded is turned back to the horizontal position shown in Fig. 1. In the use of the furnace, it is ordinarily desirable to have the two end plugs 38 in place, as shown in Fig. 1, so as to avoid any circulation of air through these several exit passages. The flow of water over the parts to be cooled is regulated in accordance with the temperature conditions desired and the furnace will be operated in accordance with standard procedure, as is well understood by those skilled in this particular art.

When making boron carbide in this furnace, anhydrous boron oxide and granular carbon, such as is found in the form of petroleum coke of high purity, are mixed in a finely divided granular condition in the required proportions. It is preferable to employ about two molecular equivalents of the boron oxide to seven equivalents of carbon. If desired, sawdust in a small amount may be incorporated in the charge to insure a suitable porosity during the furnace run. Also kerosene may be added in order that the volatile oil may vaporize at a comparatively low temperature and drive the air out of the charge and thus prevent oxidation of the boron carbide. The current flow is regulated to insure a sufficient temperature of about 2400° C. for the synthesis. During the stage of passing the electrical current through the resistor, a gradually enlarging ingot of boron carbide is made, but this material cannot be oxidized because there is no air or oxygen present. When the ingot has become of sufficient size and the current flow has been broken, then for the cooling step, the plugs 38 are put in place and the admission of air to the material is prevented.

The other carbides are made similarly from the oxides of the required metals mixed with granular carbon as is well understood. The main condition in each case is to prevent the admission of air to the heated charge and to control the escape of gases and volatile matter. For example, titanium oxide and carbon in granular condition may be mixed in the stoichiometric proportions for electrical synthesis of titanium carbide. This charge is then electrically heated in the furnace of the above described type and particular care is taken to avoid the presence of nitrogen as well as oxygen during both the heating and the cooling stages. In this way, I produce a particularly pure titanium carbide which is substantially free from the cyanonitride. The chief variation in the process for making the different abrasive metal carbides lies in using the correct stoichiometric proportions of carbon and abrasive metal oxide for the reaction. In each case, the undesired reaction with oxygen or nitrogen as well as loss by volatilization is prevented and a product of high purity is to be obtained.

This case is a division of my copending application Serial No. 50,932, filed November 21, 1935, Patent No. 2,123,158 dated July 5, 1938.

I claim:

1. The method of making an abrasive metal carbide comprising the steps of providing a mixture of carbon and the oxide of said metal proportioned for the synthesis of said carbide, charging the mixture into a closeable furnace around an electrical resistor, passing a current through the resistor and electrically heating the central zone of the charge to a synthesizing temperature and progressively forming an enlarging ingot of the metal carbide in the presence of a non-oxidizing atmosphere while applying water to the furnace wall and cooling the outer zone of the mixture to a non-reactive temperature, and thereafter cooling and solidifying the mass while excluding air therefrom and thus forming an ingot of the metal carbide without permitting oxidation thereof.

2. The method of making boron carbide comprising the steps of electrically heating a mixture of anhydrous boron oxide and carbon at its central zone in a substantially closed chamber to cause the synthesis of said carbide in a progressively enlarging ingot, while maintaining an atmosphere of carbon monoxide substantially free from air about the same and cooling the chamber wall and the outer zone of the material to prevent the escape of volatile boron compounds, and subsequently cooling the product to solidify the same while excluding access of air thereto and preventing oxidation of the boron carbide.

3. The method of making boron carbide comprising the steps of mixing granular anhydrous boron oxide and carbon in the proportions of about two molecular equivalents of boron oxide to seven of carbon, charging the mixture around a central resistor within a closeable resistance furnace, passing a current through the resistor to heat the charge to a synthesizing temperature and progressively form a gradually enlarging ingot of boron carbide conforming substantially to the formula $B_4C$, while maintaining an atmosphere of carbon monoxide substantially free from oxygen and nitrogen within the furnace and cooling the furnace walls during the furnace run to maintain the outer zone of the charge at a non-reactive temperature and to prevent the escape of volatile boron compounds, and thereafter cooling the furnace walls and forming an ingot of crystalline boron carbide while excluding air from the interior of the furnace and preventing oxidation of the boron carbide.

4. The method of making titanium carbide comprising the steps of providing a mixture of titanium oxide and carbon in substantially stoichiometric proportions, changing the mixture into a closeable furnace around an electrical resistor, passing a current through the resistor and electrically heating the central zone of the charge to a synthesizing temperature and progressively forming an enlarging zone of titanium carbide while cooling the outer charge zone to a non-reactive condition and to prevent the escape of volatile titanium compounds and thereafter cooling the mass to form an ingot of crystalline material, while maintaining an atmosphere in contact with the charge during both the reaction and the cooling stages which is substantially free from oxygen and nitrogen and thereby forming a product of high purity.

5. The method of making tungsten carbide comprising the steps of providing a mixture of tungsten oxide and carbon in required proportions, charging the mixture into a closeable furnace around an electrical resistor, passing a current through the resistor and electrically heating the central zone of the charge to a synthesizing temperature and progressively forming an enlarging zone of tungsten carbide, while cooling the furnace wall and the outer zone of the charge to a non-reactive condition, and thereafter cooling the mass to solidify the same, while maintaining an atmosphere in contact with the charge during both the reaction and the cooling stages which is substantially free from oxygen and nitrogen and thereby forming a product of high purity.

6. The method of making an abrasive metal carbide comprising the steps of mixing carbon and the metal oxide in the required proportions for synthesis of the carbide, charging the mixture around a centrally located electrical resistor in a furnace, electrically heating the charge to a synthesizing temperature and forming a progressively enlarging ingot of the carbide and thereafter cooling the same, and characterized by carrying on the synthesis within a substantially closed reaction chamber while maintaining a non-reactive atmosphere therein during both the heating and the cooling stages.

7. The method of making an abrasive metal carbide comprising the steps of providing a furnace charge containing carbon and the oxide of said metal proportioned for the synthesis of said carbide, electrically heating the charge around a resistor in a closed furnace to the temperature of reaction and progressively forming an enlarging ingot of the metal carbide, while positively excluding air from the furnace, and at the same time cooling the outer zone of the charge and controlling the temperature thereof to insure the retention of a desired volatilized reagent within the charge, and thereafter cooling and solidifying the ingot.

8. The method according to claim 7 in which the ingot is cooled and solidified after the completion of the reaction in an inert atmosphere from which oxygen and nitrogen are excluded.

RAYMOND R. RIDGWAY.